US006732758B2

(12) United States Patent
Kopp

(10) Patent No.: US 6,732,758 B2
(45) Date of Patent: May 11, 2004

(54) FLUID SHOCK ABSORBER ASSEMBLY

(75) Inventor: Raun A. Kopp, Brunswick, OH (US)

(73) Assignee: Oatey Co., Cleveland, OH (US)

( * ) Notice: Subject to any disclaimer, the term of this patent is extended or adjusted under 35 U.S.C. 154(b) by 263 days.

(21) Appl. No.: 10/003,598

(22) Filed: Nov. 26, 2001

(65) Prior Publication Data
US 2002/0134431 A1 Sep. 26, 2002

Related U.S. Application Data
(60) Provisional application No. 60/278,208, filed on Mar. 23, 2001.

(51) Int. Cl.[7] .............................................. F16K 47/02
(52) U.S. Cl. .................. 137/382; 137/377; 137/360; 137/207
(58) Field of Search ................ 137/360, 207, 137/377, 382

(56) References Cited

U.S. PATENT DOCUMENTS

| | | | | |
|---|---|---|---|---|
| 185,645 A | * | 12/1876 | Pennie | 137/360 |
| 1,203,525 A | * | 10/1916 | Fuller | 137/207 |
| 3,333,597 A | * | 8/1967 | Sullivan | 137/207 |
| 4,564,249 A | * | 1/1986 | Logsdon | 312/229 |
| 4,819,698 A | | 4/1989 | Ismert | |
| 4,865,072 A | | 9/1989 | Logsdon | |
| 5,253,670 A | * | 10/1993 | Perrott | 137/247.25 |
| 6,076,545 A | * | 6/2000 | Cooper | 137/360 |
| 6,095,195 A | | 8/2000 | Park et al. | |
| 6,148,850 A | | 11/2000 | Kopp et al. | |
| 6,155,286 A | | 12/2000 | Geary | |

OTHER PUBLICATIONS

Sioux Chief Manufacturing Company, Inc., "Water Hammer Arresters", 1999–2001, 4 web pages, Sioux Chief Manufacturing Company, Inc., Peculiar, Missouri.

* cited by examiner

Primary Examiner—A. Michael Chambers
(74) Attorney, Agent, or Firm—Anthony G. Eggink

(57) ABSTRACT

A fluid shock absorber assembly having a shut-off valve, a water hammer arrester device and a water inlet. The assembly is comprised of a low profile adaptor structure constructed and arranged to permit the assembly to be mounted in a housing enclosure for aligning and joining water lines to form washing machine and icemaker connection structures. The housing enclosure which mounts to a building structure is designed to further allow the fluid shock absorber assembly components to be installed, maintained and replaced therein.

27 Claims, 3 Drawing Sheets

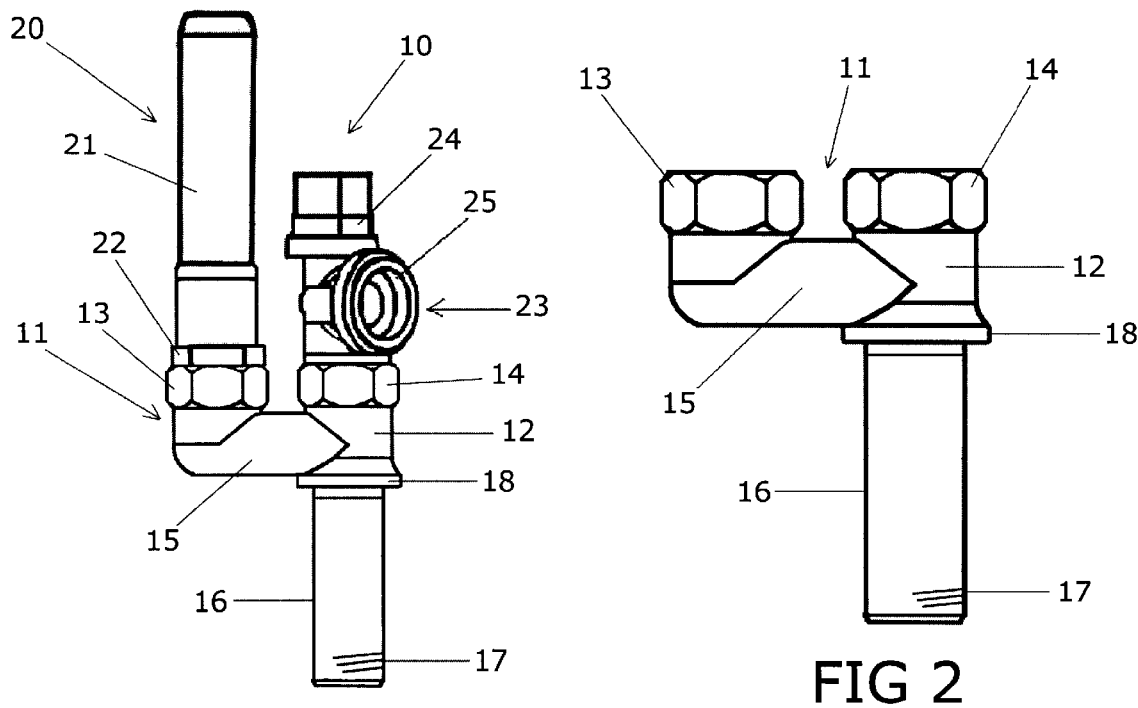
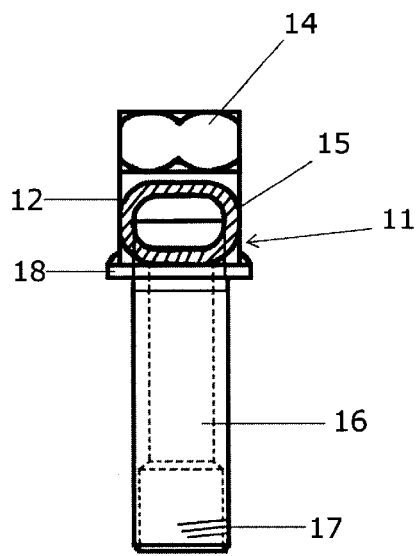
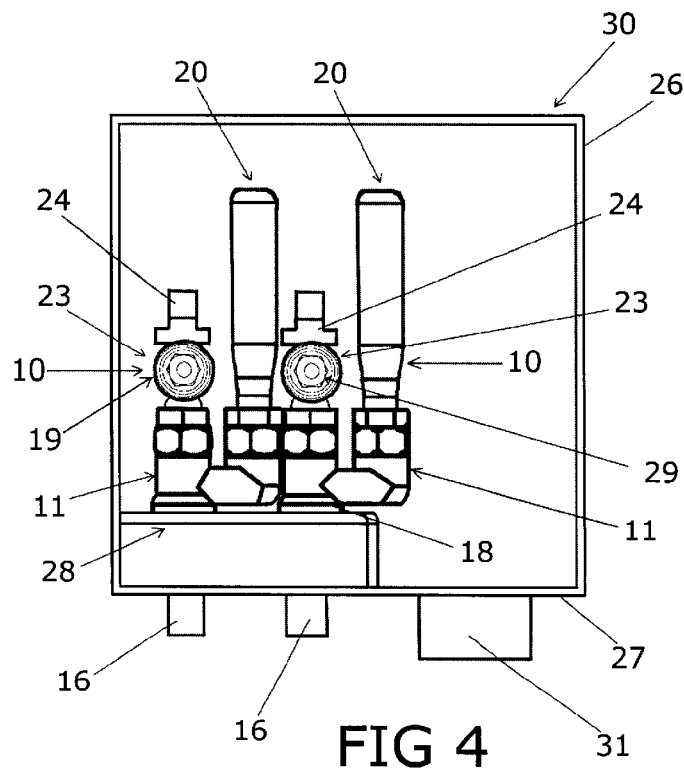

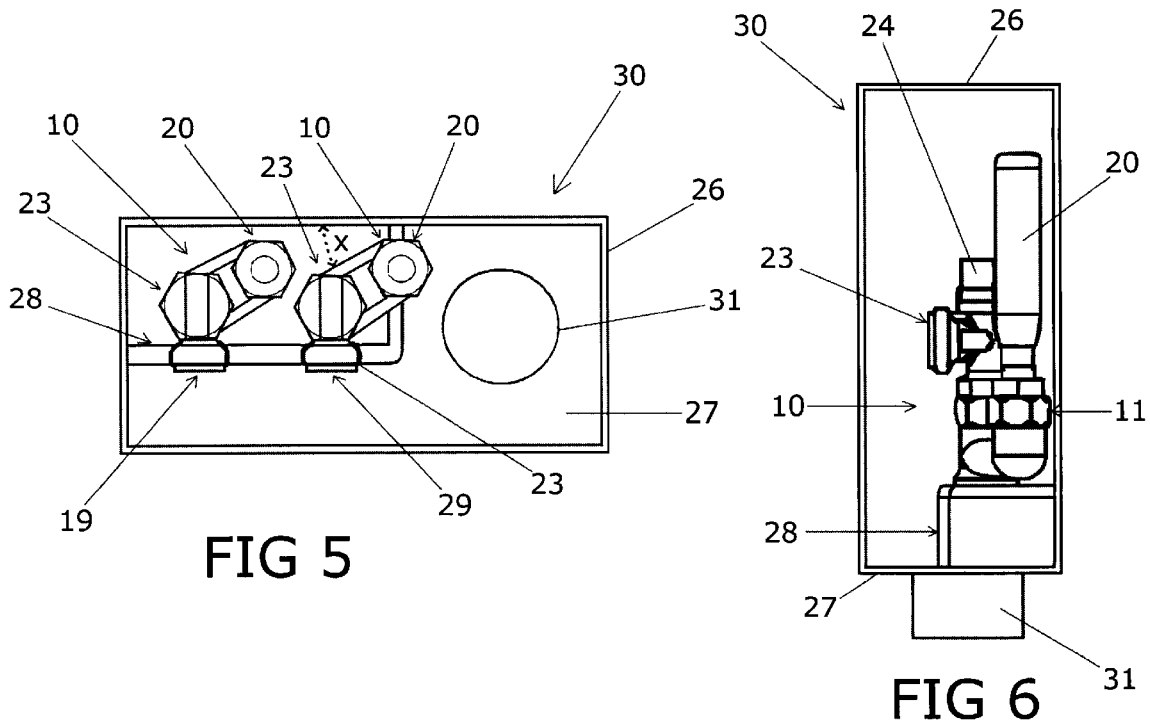
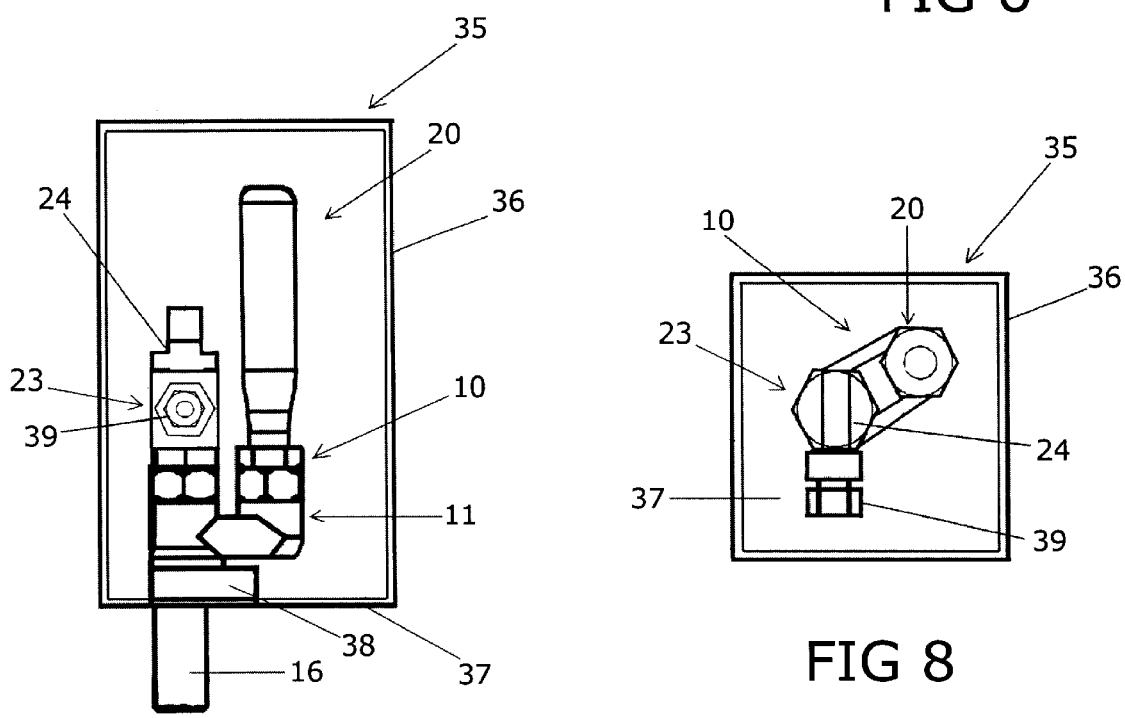

FLUID SHOCK ABSORBER ASSEMBLY

This application claims the benefit of U.S. Provisional Application No. 60/278,208 filed on Mar. 23, 2001.

BACKGROUND OF THE INVENTION

This invention relates generally to a fluid shock absorber assembly. Particularly, the invention relates to a water shock absorber assembly comprising a low profile adapter structure having a water hammer arrester device, valve means and a water inlet. The assembly is constructed and arranged for mounting in a housing enclosure for aligning and connecting water lines to form washing machine and icemaker connection structures, for example. More particularly, the invention provides a versatile shock absorber plumbing fitting for water systems. The versatile plumbing fitting comprises a low profile adapter structure having a water inlet, valve means and a water hammer arrester device for mounting in a housing for connection to appliances and having means to mount the housing within a building wall, for example.

The fluid shock absorber assembly of the invention includes a water hammer arrester device. Water hammer arrester devices are constructed and arranged to absorb fluid forces that result when fluid flow in a pipe is quickly abrupted, i.e., by a water shut-off valve in a washing machine or icemaker, for example. Commonly referred to as "hammering", pipe movement and resultant noises are generated when fluid flow is abruptly stopped. Repeated "hammering" is both aggravating to the homeowner and may damage water lines over a period of time. As a result, plumbing codes have been promulgated to require the utilization of water hammer arrester devices in plumbing systems that are subject to the quick interruption of water flow. For example, the International Plumbing Code (IPC) as well as other plumbing codes require the use of water hammer arrester devices in connection with quick closing valves where water flow is rapidly abrupted, i.e., in connection with washing machines.

A water hammer arrester device is typically constructed of a cylinder and piston arrangement in communication with a water line. A compressible fluid, such as a gas, is trapped between the piston and the cylinder end to create a pressure chamber so that forces directed to the piston are absorbed as the piston compresses the gas within the cylinder. Water hammer arrester devices are incorporated in the plumbing fixture enclosure assemblies of the present invention. The adapter structure of the invention permits the water hammer arrester devices to be mounted adjacent and in proximity to the valve structure. This proximate mounting of the arrester to the valve has been found to be most effective in dealing with water shock that results in water hammering.

Although water hammer arresters are known in connection with water lines, the installation and use of these devices have been time consuming and limited. The assemblies of the present invention overcome these difficulties and limitations by providing ease and versatility in installation, use and maintenance.

It is an object of the invention to provide a fluid shock absorber assembly which utilizes a low profile adapter structure having means to replacably receive a water hammer arrester device, a shut off valve and which has means to connect the assembly to a water supply line.

It is another object of the invention to provide a fluid shock absorber assembly utilizing water arrester devices which meet the requirements of ASSE 1010 and ANSI A 111.26.1M.

It is another object to provide an economical and effective water shock absorber assembly which is versatile in use and easy to install.

It is a further object of the invention to provide a fluid shock absorber assembly which may be mounted in a housing to form connecting boxes for washing machines and ice makers, for example.

SUMMARY OF THE INVENTION

The fluid shock absorber assembly of the invention comprises a low profile adapter having a water inlet, a water hammer arrester device and a valve structure mounted thereto. The assembly is constructed and arranged for mounting within a housing enclosure whereby various water lines may be connected and the water hammer arrester devices and valve structures may be easily replaced within the housing cavity.

Plumbing fixture enclosure assemblies are further provided utilizing the fluid shock absorber assembly of the invention. The enclosure assemblies comprise housing enclosure structures with openings to provide access for the connection and replacement of the fluid shock absorber assemblies. The housing structures have means to mount the housing enclosures to building structures, such as between vertical wall studs. Various enclosure assembly embodiments are constructed and arranged to form washing machine and icemaker connection structures or outlet boxes.

Further provided by the invention are enclosure assemblies which have raised bottom portions which are constructed and arranged to funnel any water or drainage into the drain portion positioned in the bottom panel of the housing.

In summary, enclosure assemblies are provided which are mountable within a wall and constructed and arranged to align and join with water lines and drain lines within the wall of a building structure and which allows easy access to the fluid shock absorber and valve assemblies in the housing enclosure for connection and operation with the water and drain lines of a washing machine or icemaker, for example.

These and other benefits of this invention will become apparent from the following description by reference to the drawings.

BRIEF DESCRIPTION OF THE DRAWINGS

FIG. 1 is a front plan view of the fluid shock absorber assembly of the present invention;

FIG. 2 is a front plan view of the low profile adapter structure of the assemblies of the invention;

FIG. 3 is a sectional side view of the adapter structure of FIG. 2;

FIG. 4 is a front plan view showing an embodiment of a plumbing fixture enclosure assembly utilizing the fluid shock absorber assembly of the present invention;

FIG. 5 is a sectional top view of the plumbing fixture enclosure assembly of FIG. 4;

FIG. 6 is a sectional side view of the plumbing fixture enclosure assembly of FIG. 4;

FIG. 7 is a front plan view showing another embodiment of the plumbing fixture enclosure assembly of the invention;

FIG. 8 is a sectional top view of the assembly of FIG. 7;

DESCRIPTION OF THE PREFERRED EMBODIMENTS

Figure 9:
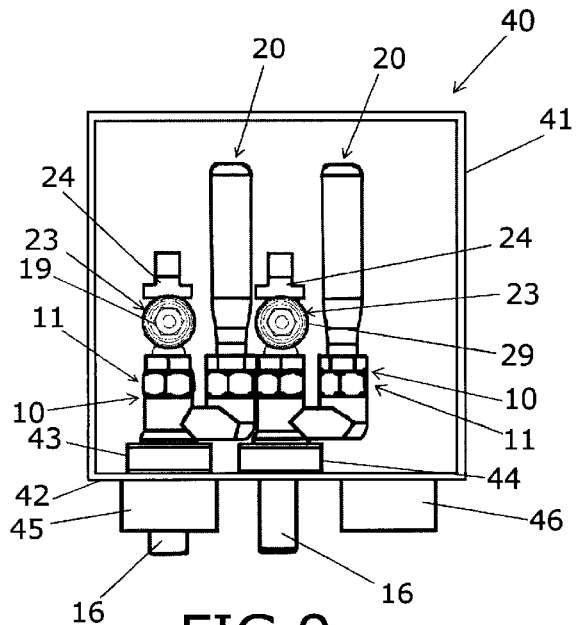
FIG. 9 is a front plan view showing another embodiment of the plumbing fixture enclosure assembly of the invention.

Referring to FIG. 1, the fluid shock absorber assembly 10 of the present invention is shown. The assembly 10 is shown comprised of an adapter structure 11 having a body structure 12, a first connecting member 13 and a second connecting member 14, a conduit portion 15 and a downwardly extending connecting member 16. A water hammer arrester device 20 is shown having a cylindrical body 21 and a base 22. The water hammer device 20 has means, i.e., threads, to connect the body 21 to the first connecting member 13 of the adapter structure 11. For example, a pair of wrenches may be used to engage the first connecting member 13 and the base 22 of arrester device 20, respectively, to threadingly secure the arrester device 20 to the adapter structure 11. A valve assembly 23 having an operating lever 24 and hose connector 25 is shown connected to the second connecting member 14 of the adapter structure 11. It is within the purview of the present invention to utilize and incorporate other valve means in the fluid shock absorbing assemblies of the present invention. The downwardly extending member 16 is preferably vertically aligned with the second connecting member 14 to form a Y-shaped body, although other structures may be utilized.

As shown in FIG. 2, the adapter structure 11 is shown to have a unitary body 12, a first connecting member 13 and a second connecting member 14, both preferably being internally threaded. The first connecting member 13 is shown in FIG. 1 to be the connection for the water hammer arrester 20 and the second connecting member 14 is shown to be the connection for the valve 23 assembly. The connecting conduit 15 is shown to have a low profile configuration which permits the adapter structure 11 to have a lower overall height and thereby reducing the height requirement of the housing enclosure within which the fluid shock absorber assembly 10 is mounted.

As shown in FIG. 3, the connecting conduit 15 of adapter structure 11 is shown to have a flattened or oval cross-section. The adapter structure 11 further has a water supply connection 16 with peripheral flange 18 and a second connector member 14 for receiving the water hammer arrester 20. The water supply connection 16 is shown to be a conduit having means for connection, such as exterior threads 17, to a water supply pipe or conduit. The utilization of the low profile adapter body structure 12 permits the valve structures and water hammer arresters to be mounted and replaced within a housing enclosure, as will be further described.

The water hammer arrester devices 20 herein are shown to have generally cylindrical body structures 21 having a bottom connection portion which secures the device 20 to the adapter body 12. The devices 20 have an internal piston which has a pressure chamber thereabove for equalizing the vibration forces generated when the water line extending from the adjacent valve is abruptly shut off. The arrester device 20 preferably has a low height which in combination with the low profile adapter structure 11 permits the various elements to be installed and replaced within a housing enclosure having predetermined dimensions. Although water hammer arrester devices having a movable piston and compressible fluid chambers are described herein, other fluid shock absorbing devices may be utilized in the assemblies of the present invention.

Referring to FIGS. 4–6, a washing machine outlet assembly 30 is shown. The assembly 30 is shown comprised of an enclosure or housing structure 26 having means for mounting to a building structure, such as a wall stud. The housing 26, preferably constructed of a molded plastic, for example, forms an enclosure having an internal cavity, a front opening and apertures in the bottom panel 27 to align and connect plumbing fixtures to water supply lines and to a drainpipe. As shown, an offset or raised portion 28 is molded as part of the bottom panel 27 for connecting plumbing fixtures to hot and cold water supply lines. A drainpipe portion 31 is shown extending from the bottom panel 27 adjacent the raised portion 28 of the housing 26. The drainpipe portion 31 is adapted to receive the hooked end of the drain conduit or hose extending from a washing machine. The fluid shock absorber assemblies 10 are shown mounted on the raised bottom portion 28 and are comprised of a pair of adapter structures 11 having hot and cold water outlet connections 19 and 29, respectively, for attachment to the washing machine. The pair of assemblies 10 are shown mounted on the raised portion 28 whereby the peripheral flange 18 of the adapter body 12 makes contact with the top surface of raised portion 28. A threaded locking nut (not shown) or like tightening member, may be threaded onto the exterior threads 17 of the downward extending water inlet member 16 to secure the assembly 10 within the housing enclosure 26.

The assemblies 10 are further shown to have valve means 23, i.e., on/off ball valves to control and shut off the flow of hot and cold water from the supply lines to the washing machine. The valve structures 23 are shown to have hose thread connectors 25 for connecting to the water supply hose ends, which extend from the washing machine. The hose thread connectors 25 are preferably removable from the valve structure 23, for example, by means of an internally formed hexagonal portion adapted for engagement by a tool, such as an Allen wrench. Thus, various water line connector members may be used with the valve structures mounted on the adapters 11 of the invention. In communication and adjacent to the hot and cold water valves are water hammer arresters 20 mounted to each adapter structure 11.

As particularly shown in FIG. 5, the fluid shock absorber assembly 10 is shown mounted on platform 28 at an angle "x" with respect to the rear wall of enclosure 26. This angled mounting configuration provides space economy of the placement of the assembly 10 in the housing 26. The angle "x" is shown to be an acute angle and is preferably approximately 25 degrees. Further, the internal threading of the first and second connecting members 13 and 14 is arranged so that the hose connector 25 of the valve assembly 23 faces outward perpendicularly to the rear wall of the rectangular housing 26 to provide easy connecting access. Although the valve assemblies 23 are preferably shown mounted to the second connecting member 14 which is vertically aligned with water inlet 16, other mounting arrangements may be utilized within the purview of the present invention. Depending upon housing enclosure configuration for example, the valve means and water hammer arrester devices may be mounted to either the first and second connecting members. Thus, preferably both internal thread configurations of connecting members 13 and 14 will provide an outward valve connection position, as shown, when the valve assembly is tightened into the adapter structure body.

The housing structures shown and described herein preferably have mounting means to connect the housing structures within the walls of a building. For example, the housing may have slots or connected slot structures adapted to receive a strap which extends or spans between adjacent wall studs, i.e., 16 inches apart, and which are fastened by nails or screws to the studs. Other fastening or mounting means known in the art may also be utilized to align and secure the enclosure assemblies of this invention within or to the wall of a building.

Referring to FIGS. 7 and 8, an icemaker outlet box assembly 35 is shown. The plumbing fixture enclosure assembly 35 is shown to have an enclosure or housing structure 36 for mounting a fluid shock absorber assembly 10 to the raised portion 38 on bottom panel 37 of the housing 36 and for connection to a water supply line. The assembly 10 further includes a valve 23 with an on/off lever 24 and a water connection member 39 for communication to the water conduit extending to the icemaker. The water connection member 39 is shown comprised of a compression nut fitting, i.e., ½ inch, for connecting a ¼ inch or a ⅜ inch water supply tube which extends to the icemaker assembly, however, the compression nut may be of any desired size and adapted to receive any desired supply tube diameter.

FIG. 9 shows another washing machine outlet connection box 40 and which has two drain conduits 45 and 46 extending from the bottom panel 42 of the enclosure 41. Depending upon the configuration of the water supply lines and the drain of the building, the assemblies 10 and the drain may be configured to match and align with the existing plumbing configuration of the building. The fluid shock absorber assemblies 10 are shown mounted to raised portions 43 and 44 and whereby the water hammer devices 20 are angled rearwardly at an acute angle with respect to the front and rear of the housing enclosure 41.

Figure 10:
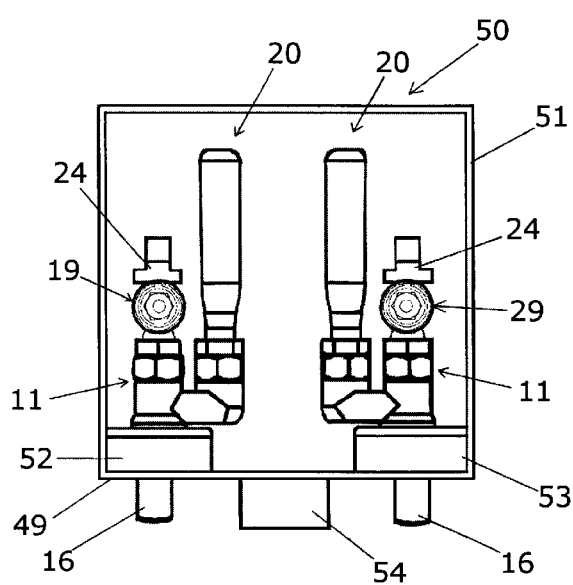
FIG. 10 is a front plan view showing another embodiment of the plumbing fixture enclosure assembly of the invention.

FIG. 10 shows a washing machine outlet connection box 50 wherein the hot and cold water supply lines are shown connected at the bottom corners of the enclosure 51 and positioned respectively on raised or offset bottom portions 52 and 53, respectively. The drain conduit 54 is shown positioned between the opposing raised bottom portions 52 and 53 and is positioned generally in the center of the bottom panel 49.

Figure 11:
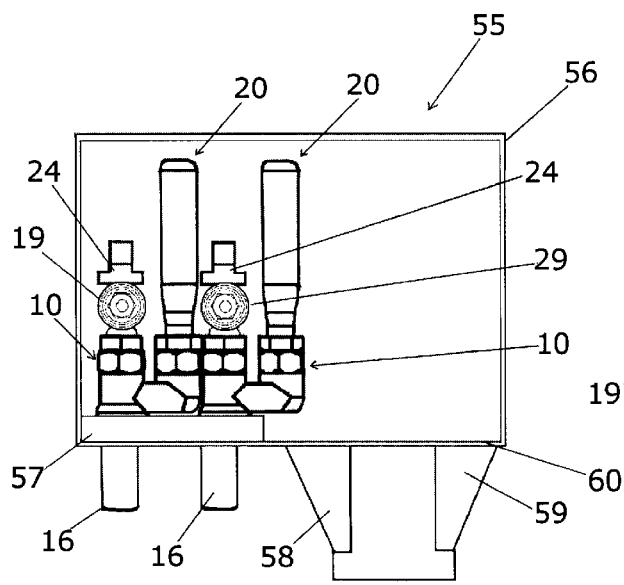
FIG. 11 is a front plan view showing another embodiment of the plumbing fixture enclosure assembly of the invention.
Figure 12:
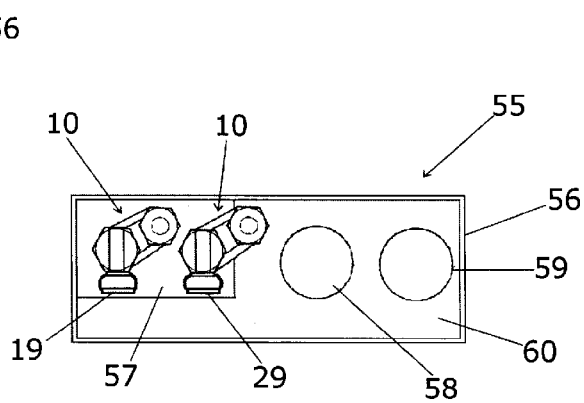
FIG. 12 is a sectional top view of the assembly of FIG. 11.

FIGS. 11 and 12 show another washing machine outlet connection enclosure 55 having the hot and cold water supply connections at one side of the bottom panel 60 and mounted on a raised bottom portion 57. The bottom portion 57 is further shown to have a pair of drain conduits 58 and 59, which in FIG. 11 are shown to funnel into a single drain outlet. The pair of fluid shock absorber assemblies 10 are shown mounted on raised portion 57 whereby the adapter structure 11 is positioned at an acute angle, as particularly shown in FIG. 12.

In summary, FIGS. 5, 6, 8 and 12 show the fluid shock absorber assemblies 10 each having a valve structure 23 and water hammer arrester device 20 directly mounted to the low profile conduit body of the assembly, and mounted in the respective housing enclosures at an angle with respect to the back portions and front openings thereof. The angled or offset positioning of the assemblies 10, i.e., at an acute angle, allow the assemblies to be repaired and replaced within the enclosure. The valve structures 23 and water hammer arrester devices 20 may be removed, i.e., by unthreading, from the connector openings of the conduit body and subsequently replaced.

The housing enclosures 26 (FIG. 4), 36 (FIG. 7), 41 (FIG. 9), 51 (FIG. 10) and 56 (FIG. 11) having dimensions, i.e., width, height and depth which permit the adapter structures 11 to be positioned and mounted on the respective bottom panels or platforms of the enclosures. Thereafter, the water hammer devices 20 and valve assemblies 23 may be connected and/or removed and replaced within the housing enclosure. For example, one embodiment of the adapter structure 11 with ¾" diameter top and bottom connectors and a width of approximately 2½ inch, a height of approximately 1¼ inches and a bottom extension 16 having a length of approximately 2 inches, may be used in a housing enclosure (i.e., enclosures 26, 41, 51 and 56) having a width of approximately 8–10.5 inches, a height of approximately 6.6–7.7 inches and a depth of approximately 3.5–3.7 inches. The latter exemplary dimensions permit the adapter structures to be installed into the housing and to be utilized with water hammer arrester devices having a height of approximately 4.5 inches and a valve assembly having a height of approximately 2.0 inches.

The use and placement of the fluid shock absorber assemblies of the present invention in the housing enclosures shown in FIGS. 4–12 are exemplary. The fluid shock absorber assemblies of the invention may be utilized in a variety of settings to reduce the effects of water hammering.

As many changes are possible to the plumbing fixture embodiments of this invention, utilizing the teachings thereof, the description above and the accompanying drawings should be interpreted in the illustrative and not the limited sense.

That which is claimed is:

1. A plumbing fixture for connection to an appliance comprising a generally Y-shaped low profile unitary adapter structure having a top and bottom portion, a first and a second internally threaded fluid outlet connector opening extending from said adapter structure top portion and an externally threaded fluid inlet conduit extending from said adapter structure bottom portion, said adapter structure having a generally flattened cross-sectional profile extending between said first and second connector openings, said fluid inlet conduit being vertically aligned with said second fluid outlet connector opening.

2. The plumbing fixture of claim 1, wherein an annular flange with a generally flat bottom surface is provided on the bottom portion of said adapter structure about said inlet conduit.

3. The plumbing fixture of claim 1, wherein said first and second outlet connector openings are formed of a hexagonal configuration.

4. The plumbing fixture of claim 1, wherein a water hammer arrester device is mounted to said first connector outlet opening and wherein a valve structure is mounted to said second connector outlet opening of said adapter structure.

5. A fluid shock absorber assembly comprising:
   a) a unitary low profile conduit structure for unimpeded fluid flow, said conduit structure having an open horizontally disposed interior bore with a height and width, said width being greater than said height, said conduit structure having a top and bottom and terminating at each end in aligned first and second top connector outlet openings and further having a downwardly extending fluid inlet conduit with a circumferential shoulder adjacent the external intersection of said bottom of said conduit structure and said fluid inlet conduit, said fluid inlet conduit being in unimpeded fluid communication with said first and second top connector outlet openings of said horizontally disposed interior bore of said low profile conduit structure;
   b) a fluid shock absorber means mounted for removal and direct connection to said first top connector outlet opening; and c) valve means removably mounted directly to said second top connector outlet opening.

6. The fluid shock absorber assembly of claim 5, wherein said fluid shock absorber means is a cylindrical structure having compressible means captured therein.

7. The fluid shock absorber assembly of claim 5, wherein said valve means has on/off means and a connector opening for communication with a fluid line to an appliance.

8. The fluid shock absorber assembly of claim 7, wherein said connector opening of said valve structure is a compression fitting.

9. The fluid shock absorber assembly of claim 5, further comprising a housing enclosure having a frontal opening, a bottom with at least one aperture and wherein said assembly is mounted within the cavity of said housing enclosure with said circumferential shoulder engaging said bottom panel and said downwardly extending fluid inlet conduit extending through said at least one aperture.

10. The fluid shock absorber assembly of claim 9, wherein a second assembly is mounted within said cavity of said enclosure and further wherein said enclosure has a bottom panel having at least a second aperture.

11. The fluid shock absorber assembly of claim 9 being mounted in said housing enclosure at a predetermined angle with respect to said frontal opening of said housing enclosure.

12. The fluid shock absorber assembly of claim 11, being mounted in said housing enclosure whereby said second top connector outlet opening of said conduit structure and said valve means mounted directly thereto are closest in proximity to said frontal opening of said housing enclosure.

13. The fluid shock absorber assembly of claim 5, wherein said low profile conduit device is formed of a unitary metallic or plastic structure and wherein said first and second connector top outlet openings and said downwardly extending fluid inlet conduit opening are threaded.

14. A plumbing fixture for connection to an appliance comprising:
a) an adapter structure having a unitary low profile body with a first outlet connecting member, a second outlet connection member and a downwardly extending inlet member, said adapter structure further having a generally flattened open conduit portion in communication with said first and second outlet connecting members and said downwardly extending inlet member, said generally flattened open conduit portion having a generally oval cross-sectional configuration, said downwardly extending inlet member having connecting means for a fluid inlet line;
b) a valve structure having fluid control means and being connected to said first outlet connecting member of said adapter structure; and
c) a water hammer arrester structure having a generally cylindrical structure connected to said second outlet connecting member of said adapter structure.

15. The plumbing fixture of claim 14, wherein said first and second outlet connecting members are unitary with and extend upwardly from said low profile body and wherein said first and second upwardly extending outlet connecting members of said adapter are internally threaded and wherein said water hammer arrester structure has an externally threaded bottom portion for threading connection to said first connecting outlet member and wherein said valve structure has an externally threaded bottom portion for threading connection to said second outlet connecting member.

16. The plumbing fixture of claim 14, further comprising an enclosure structure having a bottom portion and an open frontal area, said adapter structure being mounted to said bottom portion of said enclosure whereby said water arrester structure and said valve structure are accessible, removable and replaceable through said frontal area of said enclosure structure.

17. The plumbing fixture of claim 16, wherein said enclosure structure further has means to mount said enclosure to a building component.

18. The plumbing fixture of claim 16, wherein two adapter structures each having a water arrester structure and a valve structure are mounted within said enclosure and further wherein said downwardly extending inlet member of one said plumbing fixture is connected to a cold water source and wherein said downwardly extending inlet member of the other plumbing fixture is connected to a hot water source.

19. The plumbing fixture of claim 16, wherein a drain aperture is provided in said bottom portion of said enclosure.

20. The plumbing fixture of claim 16, wherein said enclosure structure includes at least one raised portion extending upward from said bottom portion of said enclosure structure and wherein said adapter structure is mounted on said raised portion.

21. The plumbing fixture of claim 14, wherein said second upwardly extending outlet connecting member has a first diameter and wherein said generally cylindrical structure of said water hammer arrester structure has a second diameter and wherein said second diameter is generally the same or less than said first diameter.

22. The plumbing fixture of claim 16, wherein said adapter structure is mounted in said enclosure structure at a predetermined angle with respect to said open frontal area of said enclosure structure.

23. A plumbing fixture enclosure assembly having an adapter fixture mounted therein, comprising:
a) a housing having a bottom, a frontal opening and means to mount the housing to a building structure, said bottom of said housing having at least one aperture therethrough, said at least one aperture in said bottom including a first aperture;
b) an adapter fixture having a unitary formed fixture body with two ends and an open conduit portion therebetween, said open conduit portion further having a generally flattened cross-sectional configuration, said fixture body further having a first outlet connecting member at one end in communication with said conduit portion, a second outlet connecting member at the opposite end in communication with said conduit portion and a downwardly extending inlet conduit in communication with said conduit portion, said adapter fixture being mounted in said housing whereby said downwardly extending inlet conduit extends through said first aperture and whereby said formed fixture body is disposed at a predetermined angle with respect to said frontal opening of said housing;
c) a valve structure having a control lever and being connected to said first outlet connecting member of said adapter fixture; and
d) a water hammer arrester device connected to said second outlet connecting member of said adapter fixture.

24. The plumbing fixture enclosure assembly of claim 23, wherein said bottom of said housing has a second aperture and a third aperture and further wherein a second adapter fixture is mounted in said housing whereby said downwardly extending inlet conduit of said second adapter fixture extends through said second aperture, said third aperture being adapted to receive a drain hose from a washing machine, said second adapter fixture being mounted at the same said angle with respect to said frontal opening as said first adapter fixture whereby said formed bodies of said first and second adapter fixtures are mounted in a generally parallel arrangement to each other in said housing.

25. The plumbing fixture enclosure assembly of claim 24, wherein said housing has a raised bottom portion and wherein said first and second apertures are disposed in said raised bottom portion.

26. The plumbing fixture enclosure assembly of claim 23, wherein said predetermined angle of said formed fixture body with respect to said frontal opening of said housing is an acute angle.

27. The plumbing fixture enclosure assembly of claim 26, wherein said adapter fixture is mounted in said housing whereby said first outlet connecting member and said valve structure connected thereto is closest in proximity to said frontal opening.

* * * * *